(12) United States Patent
Hursey et al.

(10) Patent No.: US 9,344,560 B2
(45) Date of Patent: *May 17, 2016

(54) CONVERSATION RECORDING WITH REAL-TIME NOTIFICATION FOR USERS OF COMMUNICATION TERMINALS

(71) Applicant: AT&T Mobility II LLC, Atlanta, GA (US)

(72) Inventors: John T. Hursey, Lawrenceville, GA (US); Robert Z. Evora, Simi Valley, CA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/927,872

(22) Filed: Oct. 30, 2015

(65) Prior Publication Data

US 2016/0050313 A1     Feb. 18, 2016

Related U.S. Application Data

(63) Continuation of application No. 12/872,578, filed on Aug. 31, 2010, now Pat. No. 9,191,502, which is a continuation of application No. 11/060,399, filed on Feb. 18, 2005, now Pat. No. 7,813,481.

(51) Int. Cl.
| | |
|---|---|
| *H04M 1/64* | (2006.01) |
| *H04M 3/42* | (2006.01) |
| *H04M 1/725* | (2006.01) |
| *H04W 4/12* | (2009.01) |

(52) U.S. Cl.
CPC ........ *H04M 3/42221* (2013.01); *H04M 1/7255* (2013.01); *H04W 4/12* (2013.01)

(58) Field of Classification Search
CPC .................................................. H04M 3/42221
See application file for complete search history.

(56) References Cited

U.S. PATENT DOCUMENTS

| | | |
|---|---|---|
| 4,124,773 A | 11/1978 | Elkins |
| 4,815,132 A | 3/1989 | Minami |
| 5,136,648 A | 8/1992 | Olson et al. |

(Continued)

OTHER PUBLICATIONS

U.S. Office Action dated Apr. 6, 2009 in U.S. Appl. No. 11/060,399.

(Continued)

*Primary Examiner* — Joseph T Phan
(74) *Attorney, Agent, or Firm* — Hartman & Citrin LLC

(57) ABSTRACT

A recording device provides conversation recording with real-time notification between users of communication terminals engaged in a conversation. The recording device provides a recording start notification to a second communication terminal in response to receiving an initiate recording request from a first communication terminal, and initiates recording of the conversation. The recording device terminates recording of the conversation in response to receiving a terminate recording request from the first communication terminal, provides a recording stop notification to the second communication terminal, and saves the recorded conversation to a file in a file storage medium. The recording start and recording stop notifications can be either audible or electronic notifications. The first communication terminal may be muted prior to providing a notification, and un-muted subsequent to the notification. The recording device may obtain permission from the second communication terminal to record the conversation.

20 Claims, 6 Drawing Sheets

(56) References Cited

U.S. PATENT DOCUMENTS

| | | | |
|---|---|---|---|
| 5,559,875 A | 9/1996 | Bieselin et al. | |
| 5,566,230 A | 10/1996 | Cairo | |
| 5,568,539 A | 10/1996 | Bergsman et al. | |
| 5,594,798 A | 1/1997 | Cox et al. | |
| 6,246,752 B1 | 6/2001 | Bscheider et al. | |
| 6,529,602 B1 | 3/2003 | Walker et al. | |
| 6,587,556 B1 | 7/2003 | Judkins et al. | |
| 6,668,044 B1 * | 12/2003 | Schwartz | H04M 3/42221 379/207.01 |
| 6,724,887 B1 | 4/2004 | Eilbacher et al. | |
| 6,766,000 B2 | 7/2004 | Squibbs et al. | |
| 6,898,277 B1 | 5/2005 | Meteer et al. | |
| 6,937,705 B1 | 8/2005 | Godfrey et al. | |
| 7,042,989 B2 | 5/2006 | Lawson et al. | |
| 7,219,054 B1 | 5/2007 | Begeja et al. | |
| 7,395,959 B2 | 7/2008 | Kirkland et al. | |
| 7,499,530 B2 | 3/2009 | Carroll et al. | |
| 7,548,539 B2 | 6/2009 | Kouretas et al. | |
| 7,813,481 B1 | 10/2010 | Hursey et al. | |
| 7,881,471 B2 * | 2/2011 | Spohrer | H04L 63/0428 379/112.01 |
| 7,916,845 B2 * | 3/2011 | Rae | H04M 7/006 379/188 |
| 8,077,832 B2 | 12/2011 | Othmer et al. | |
| 8,121,264 B1 | 2/2012 | Hogg et al. | |
| 8,401,155 B1 * | 3/2013 | Barnes | H04M 3/51 370/352 |

OTHER PUBLICATIONS

U.S. Office Action dated Nov. 13, 2009 in U.S. Appl. No. 11/060,399.
U.S. Advisory Action dated Apr. 14, 2010 in U.S. Appl. No. 11/060,399.
U.S. Notice of Allowance dated Jun. 11, 2010 in U.S. Appl. No. 11/060,399.
U.S. Office Action dated Mar. 15, 2012 in U.S. Appl. No. 12/872,578.
U.S. Office Action dated Jan. 9, 2014 in U.S. Appl. No. 12/872,578.
U.S. Office Action dated Sep. 24, 2014 in U.S. Appl. No. 12/872,578.
U.S. Office Action dated Apr. 28, 2015 in U.S. Appl. No. 12/872,578.
U.S. Notice of Allowance dated Jul. 7, 2015 in U.S. Appl. No. 12/872,578.

* cited by examiner

CONVERSATION RECORDING WITH REAL-TIME NOTIFICATION FOR USERS OF COMMUNICATION TERMINALS

CROSS-REFERENCE TO RELATED APPLICATIONS

This application is a continuation of U.S. patent application Ser. No. 12/872,578, entitled "Conversation Recording with Real-Time Notification for Users of Communication Terminals," filed Aug. 31, 2010, now U.S. Pat. No. 9,191,502, which is a continuation of U.S. patent application Ser. No. 11/060,399 entitled "Conversation Recording with Real-Time Notification for Users of Communication Terminals", filed Feb. 18, 2005, now U.S. Pat. No. 7,813,481, all of which are incorporated herein by reference in their entireties.

BACKGROUND OF THE INVENTION

1. Field of the Invention

This invention relates to conversation recording with real-time notification for users of communication terminals. More particularly, the invention relates to recording of conversations between users of communication terminals, such as telephones, and providing a real-time notification to at least the second party in the conversation that they are being recorded, for legal reasons.

2. Description of Related Art

Often, when parties are having an active telephone conversation, one party will wish to make a record of some item of information being discussed. However, the one party may be without a writing instrument and paper to record the information, or they may be unable to write because they are moving about. In the past, this situation usually required the telling party (the party conveying the information) to call back and leave a voicemail message or a message on an answering machine. Alternatively, the telling party could also compose an email message or a text message containing the information. These steps can sometimes be very problematic to the parties. Thus, it would be useful to be able to make an audio recording of the conversation for later playback, thereby eliminating the above-described issues.

Many communication terminals cannot make an audio recording of a conversation but could initiate a network service to do so. However, such network services do not interwork with communication terminals in real-time to provide the parties with audible or electronic notifications that they are being recorded.

Additionally, some devices can record a conversation, but they do not reside in the communication terminals and interwork with communication terminals in real-time to provide the telling party with an audible or electronic notification that they are being recorded.

SUMMARY OF THE INVENTION

The system and method of the present invention meets these needs, and others, by providing conversation recording with real-time notification between users of communication terminals engaged in a conversation. Advantageously, the invention provides a voice recorder function in a communication system, in real-time, that gives the caller an audible and/or an electronic notification that they are about to recorded. Giving the caller notification that they are about to be recorded is useful for legal reasons. The feature can be implemented in the handset or in the network.

A system for recording a conversation between users of communication terminals, according to the invention, generally has: a first communication terminal; a second communication terminal in communication with the first communication terminal, whereby the user of the first communication terminal and the user of the second communication terminal can have a conversation; and a recording device for: providing a recording start notification to the second communication terminal in response to receiving an initiate recording request from the first communication terminal; and initiating recording of the conversation.

Advantageously, the system further includes a file storage medium in communication with the recording device. The recording device is further for: terminating recording of the conversation in response to receiving a terminate recording request from the first communication terminal; providing a recording stop notification to the second communication terminal; and saving the recorded conversation to a file in the file storage medium. The file will contain identifying numbers of all known parties to the conversation, a date and time stamp indicating the start time of the recorded conversation, and an indication of the duration of the recorded conversation.

According to one aspect of the invention, the recording device sends a mute command to the first communication terminal prior to providing the recording start notification or the recording stop notification to the second communication terminal. Also, the recording device sends an un-mute command to the first communication terminal subsequent to providing the recording start notification or the recording stop notification to the second communication terminal.

In another aspect of the invention, the recording start notification and the recording stop notification are electronic notifications to the user of the second communication terminal indicating the date and time that the recording was initiated or terminated.

According to yet another aspect of the invention, the recording device sends a permission request to the second communication terminal following the step of providing the recording start notification, and receives a permission acknowledgment from the user of the second communication terminal prior to the step of initiating recording of the conversation. The permission request can be either an electronic message prompting acknowledgment by return electronic message, or an audible notification prompting acknowledgment by an audible response.

The recording device can also send a call leg restriction command to the terminals following initiating recording of the conversation, to prevent the parties from adding any other call legs to the conversation.

According to an implementation of the system where the recording device is a remote notification and recording platform bridged on to the conversation through a communication network, the recording start notification and the recording stop notification are audible notifications to all of the parties to the conversation. Additionally, in this implementation, the remote notification and recording platform further: offers the parties to the conversation an opportunity, via DTMF dialing, to enter their numbers to receive electronic notifications that recording of the conversation has initiated or terminated.

Lastly, according to an implementation of the system where the recording device is in the first communication terminal, the recording device: mutes the terminal's microphone in response to receiving an initiate recording request from the terminal's touchpad; provides an audible recording start notification to the second communication terminal; un-mutes the first terminal's microphone; and initiates recording of the conversation. Likewise, upon terminating recording of the conversation, the recording device: mutes the first terminal's microphone, provides an audible recording stop notification to the second terminal, and unmutes the first terminal's microphone. Electronic start and stop notifications are also provided by this implementation.

Some system aspects of the invention could be implemented on digital computing equipment. Further, some method aspects of the invention may be found as executable instructions in computer software contained on a computer readable medium.

No limitations on the invention should be taken from the preceding summary, as it is merely intended to summarize the various aspects of the invention. The invention will be better understood by reference to the following detailed description and the appended drawings and claims.

DETAILED DESCRIPTION OF EXEMPLARY EMBODIMENTS

In general, the exemplary embodiments of the invention provide a voice recorder function that can be used to record real-time voice conversations between users of communication terminals, such as telephones, and deliver an audible (voice band) or electronic (non-voice band) notification that the conversation is being recorded. The voice recorder function is provided by a recording device that may either be located in one of the communication terminals, or located in a remote notification and recording platform such as a voice-mail platform or a specialized Intelligent Voice Response (IVR) system. If a remote notification and recording platform is used, it may be bridged on to the conversation using standard multi-party conferencing methods. Thus, Person A calls Person B and a conversation ensues. Person A decides to record the conversation with Person B and initiates the recording using a touchpad mechanism on their communication terminal. The recording device then provides a notification to Person B that the conversation is being recorded. When Person A decides to stop recording the conversation, they use the touchpad mechanism on their communication terminal to terminate recording. The recording device then provides a notification to Person B that the conversation is no longer being recorded. Once the recording is complete and the file saved, Person A can e-mail or download the file to remote computer or email accounts.

As used herein, a communication terminal is any device capable of sending and receiving voice signals to and from at least one other such communication terminal, such that the users of such communication terminals can have a conversation. Examples of such communication terminals include landline or wireline phones, mobile or cellular phones, other wireless devices (such as IPager/IPHONE devices), voice-over-internet-protocol (VoIP) phones, video phones, or the like.

As used herein, a recording device is a device capable of recording a conversation between communication terminals. For example, a recording device may be a remote notification and recording platform bridged into the conversation using standard multi-party conferencing methods, or the recording device function may be built into the communication terminal.

As used herein, a conversation between communication terminals should be understood to include any communication between communication terminals.

It should be noted that many of the principles of the invention described and claimed herein will apply equally to wireless, wireline and other telecommunication systems. Thus, the description of the exemplary embodiments should not be construed as a limitation on either the spirit or the scope of the claimed invention.

System and Method for Recording a Conversation

Figure 1:
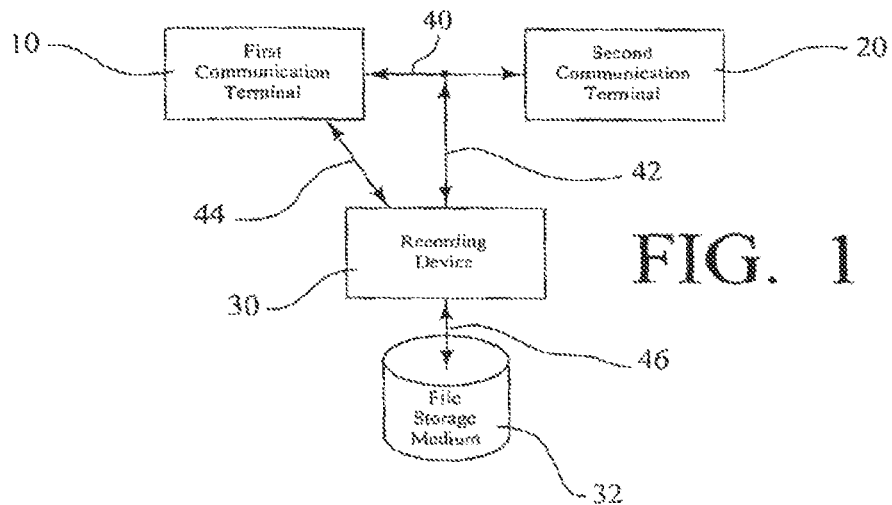
FIG. 1 is a block diagram showing a system for recording a conversation according to an embodiment of the invention.

FIG. 1 shows an exemplary system for recording a conversation. The exemplary system has a first communication terminal 10, a second communication terminal 20, a recording device 30 and a file storage medium 32.

The first communication terminal 10 and the second communication terminal 20 are in communication through a first communication terminal-second communication terminal communication link 40, such that the users of the respective terminals can have a conversation. The first communication terminal-second communication terminal communication link 40 may utilize a communication network, such as a wireless, a wireline or a combination network.

Figure 2:
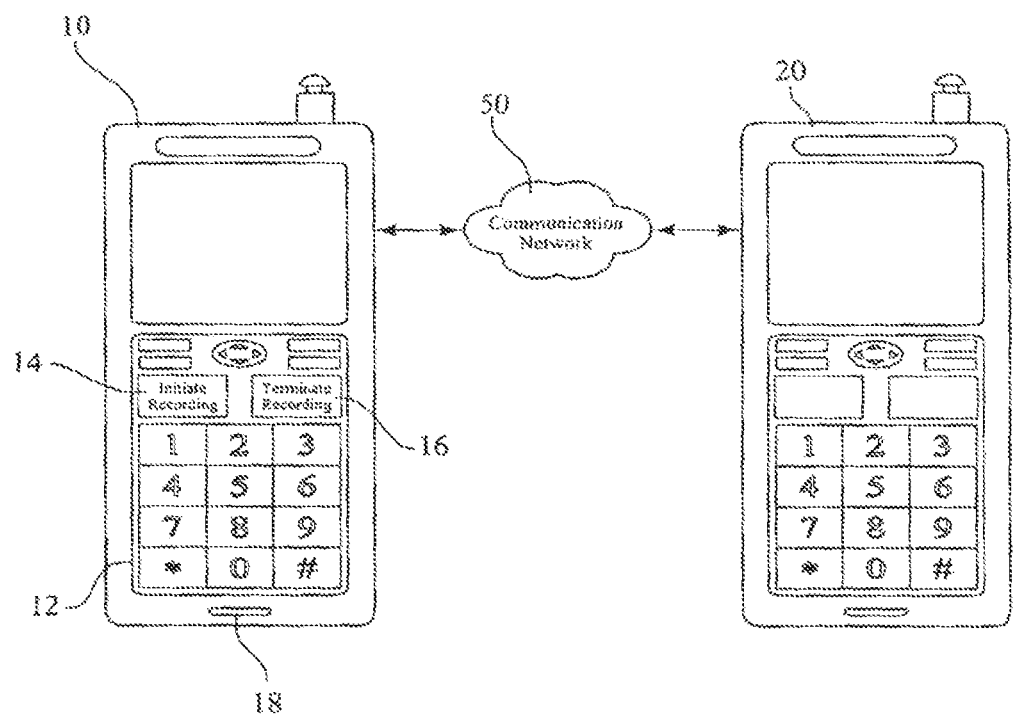
FIG. 2 is a diagram showing representative communication terminals and a communication network according to an exemplary embodiment of the invention.

FIG. 2 shows a representative first communication terminal 10, a representative second communication terminal 20, and a representative communication network 50 which serves as a first communication terminal-second communication terminal communication link. The representative first communication terminal 10 has a touchpad 12 for dialing telephone numbers and accessing features of the terminal. Such a touchpad 12 may include hard keys (actual buttons), soft keys (typical multi-functional menu buttons and procedures), touch screen keys, or a combination of key types. As shown, the touchpad 12 has an initiate recording button 14 for initiating recording of a conversation and a terminate recording button 16 for terminating recording of a conversation. However, the functions of the initiate recording button 14 and the terminate recording button 16 may also be accomplished with soft keys. Also, the representative first communication terminal 10 has a microphone 18.

Returning now to FIG. 1, the recording device 30 of the exemplary system is in communication with the first communication terminal-second communication terminal communication link 40 through a recording communication link 42, such that the recording device 30 can record the conversation. As mentioned above, the recording device 30 may be located in one of the communication terminals, or may be located in a remote notification and recording platform. If the recording device 30 is located in one of the communication terminals, the recording communication link 42 is internal to the terminal. If the recording device 30 is remotely located, the recording communication link 42 is a bridge to the first communication terminal-second communication terminal communication link 40 using standard multi-party conferencing methods.

The first communication terminal 10 is in communication with the recording device 30 through a first communication terminal-recording device communication link 44. This link 44 could also be internal to the first communication terminal 10 or through a bridge configuration, depending on the location of the recording device 30.

The file storage medium 32 is in communication with the recording device 30 through a recording device-file storage medium communication link 46. The file storage medium 32 can be internal to the recording device 30, in which case the recording device-file storage medium communication link 46 would be internal to the recording device 30. However, the file storage medium 32 could also be external to the recording device 30 in which case the recording device-file storage medium communication link 46 would be a data-type link.

The file storage medium 32 is for storing a recorded conversation file generated by the recording device 30. Either the file storage medium 32 or the recording device 30 will have an interface (not shown) for receiving a request for the recorded conversation file and sending the recorded conversation file as requested.

Figure 3:
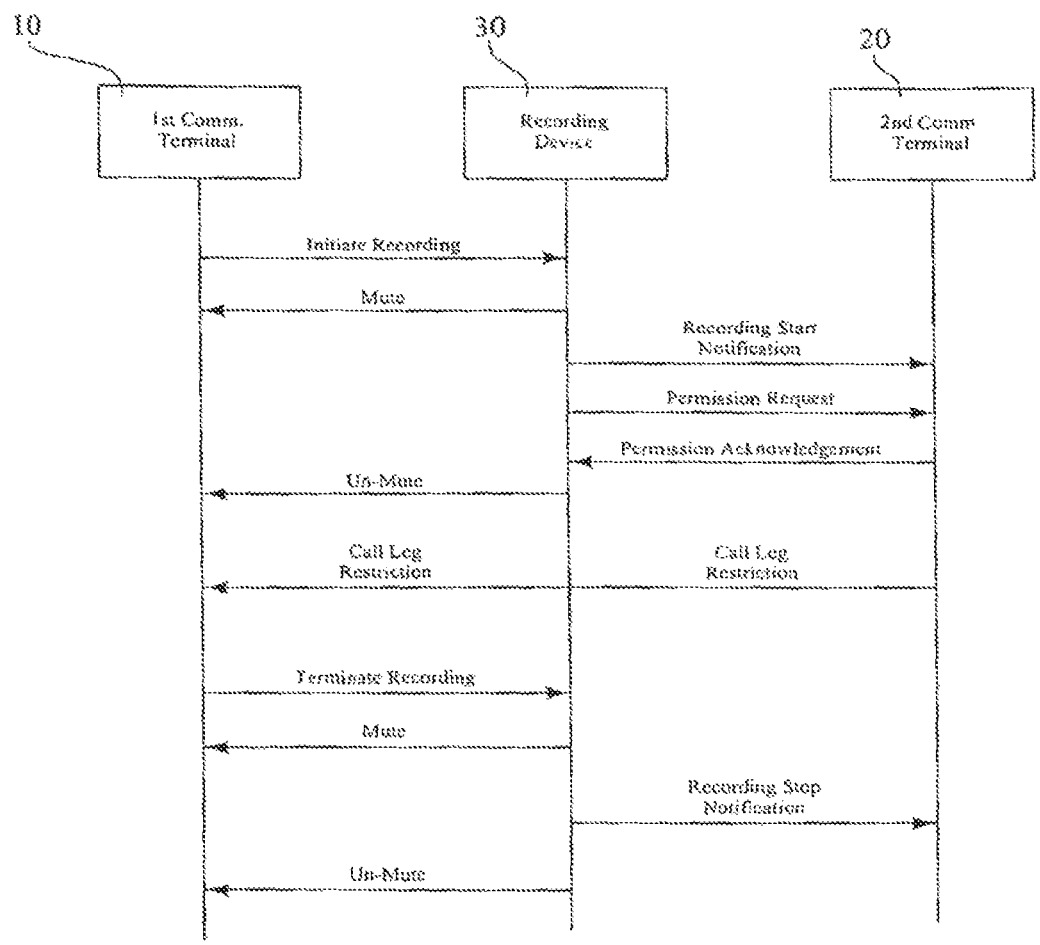
FIG. 3 is a call flow diagram showing call flows of the system of FIG. 1.

In operation, as shown in FIG. 3, the recording device 30 will receive an initiate recording request from the first communication terminal 10 to initiate recording of the conversation. The user of the first communication terminal 10, or Person A, generates the initiate recording request using the initiate recording button 14 (or soft key) of the touchpad 12 of the first communication terminal 10.

In response, the recording device 30 will provide a recording start notification to the second communication terminal 20, and initiate recording of the conversation. In the event that the recording start notification is an audible notification to the user of the second communication terminal 20, the recording device 30 may send a mute command to the first communication terminal 10 prior to providing the notification. The operating system of the first communication terminal 10 will then mute the microphone 18 of the first communication terminal 10 such that the user of the second communication terminal 20 will hear only the audible notification from the recording device 30 without any interference from sound received from the microphone 18 of the first communication terminal 10. Alternatively, the mute function could be implemented in the second communication terminal 20 or in the communication network 50, such that the user of the second communication terminal 20 will hear only the audible notification. Preferably, the user of the first communication terminal 10 will also hear the audible notification. An un-mute command will follow the audible notification, such that the conversation may resume. Alternatively, the recording start notification may be an electronic, non-voice band notification to the user of the second communication terminal 20 indicating the date and time that the recording was initiated. Examples of such an electronic notification include a Short Message Peer-to-Peer Protocol (SMPP) message, a Short Message Service (SMS) message, or the like. Additionally, the user of the second communication terminal 20 may also be given an opportunity to enter their number, via DTMF dialing, to receive an electronic notification, such as SMPP, in addition to the audible notification.

Figure 4:
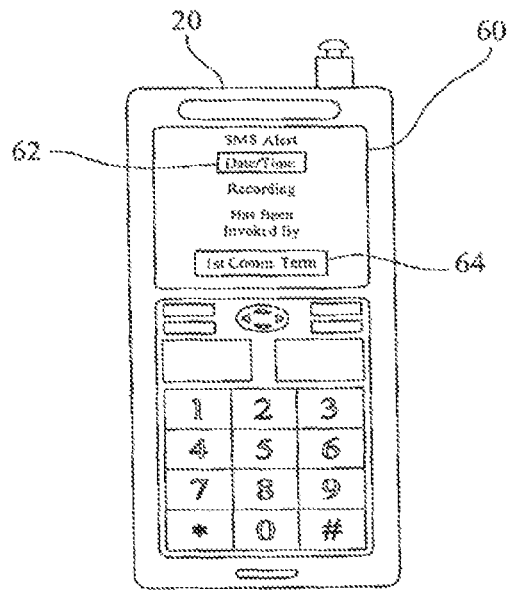
FIG. 4 is a diagram showing a representative electronic recording start notification on a representative communication terminal.

FIG. 4 shows a representative SMS text message 60 as might be received by a second communication terminal 20. The representative SMS text message includes a date/time stamp 62 indicating the date and time that recording was initiated by the recording device, and an identifier 64 of the first communication terminal. The identifier 64 of the first communication terminal could be a telephone number for the terminal, or a name of the user of the terminal.

Returning to FIG. 3, in order to verify that the user of the second communication terminal 20, Person B, has received the recording start notification, the recording device 30 may further request a response of some affirmative action by Person B. Thus, in the embodiment shown, the recording device 30 sends a permission request to the second communication terminal 20 following the step of providing the recording start notification. The recording device 30 must then receive a permission acknowledgment from the second communication terminal 20 prior to initiating recording of the conversation. The permission request can be sent by electronic text messaging, and prompt the user of the second communication terminal 20 to send the permission acknowledgment by return electronic messaging. An example of such electronic messaging is SMS text messaging. Alternatively, the permission request can be an audible request, and prompt the user of the second communication terminal to send a permission acknowledgment by an audible response. Examples of such an audible response include a spoken response, such as "yes", or a tone generated by the second communication terminal 20, such as the DTMF tone generated by a particular button of the telephone touchpad. For example, the recording start notification and permission request might be in the form of an audible message stating, "You are about to be recorded, please authorize the recording of this call by stating "yes" or pressing the "1" button." The recording device 30 then records the response as a "voice signature" authorizing the recording. Thus, the user of the second communication terminal 20 would have taken an affirmative action to confirm that they have received the recording start notification. If the user of the second communication terminal 20 does not want to be recorded, they should hang up.

The recording device 30 may also send a call leg restriction command to the first communication terminal 10 and the second communication terminal 20. The operating systems of the communication terminals would then prevent the communication terminals from establishing other call legs while the recording is active. The call leg restriction function is dependent on each communication terminal having the capability of restricting the communication terminal from multi-party calls.

As best understood by reference to FIGS. 1 and 3, when the user of the first communication terminal 10, Person A, decides to stop recording the conversation, they use the touchpad 12 of the first communication terminal 10 to generate a terminate recording request. In response, the recording device will terminate recording of the conversation, save the recorded conversation to a file in the file storage medium 32, and provide a recording stop notification to the second communication terminal 20. In the event that the recording stop notification is an audible notification, the recording device 30 may send a mute command to the first communication terminal 10 prior to providing the notification such that the user of the first communication terminal 10 will not hear the audible notification. An un-mute command will follow the audible notification so that the conversation may resume. Alternatively, the recording stop notification may be an electronic notification to the user of the second communication terminal 20 indicating the date and time that the recording was terminated. Such an electronic notification could be, for example, an SMPP message, an SMS message, or the like. Further, it should be noted that the recording device 30 may also be stopped by Person A terminating the conversation (i.e. hanging-up).

Figure 5:
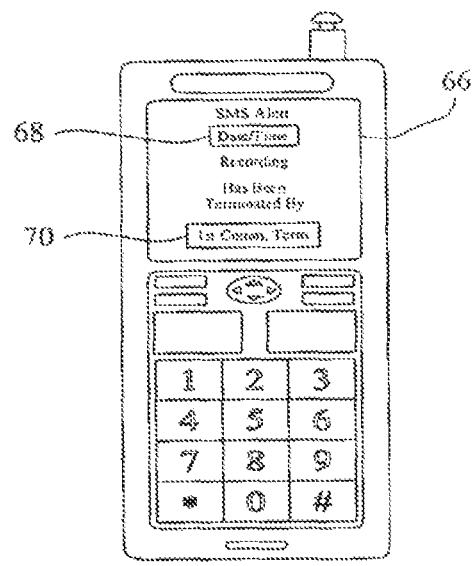
FIG. 5 is a diagram showing a representative electronic recording stop notification.

FIG. 5 shows a representative SMS text message 66 as might be received by a second communication terminal. The representative SMS text message 66 includes a date/time stamp 68 indicating the date and time that recording was terminated by the recording device, and an identifier 70 of the first communication terminal 10. The identifier 70 of the first communication terminal could be a telephone number for the terminal, or a name of the user of the terminal.

Once the recording is complete, recording device 30 saves the file in the file storage medium 32. Person A can now e-mail or download the file to remote computer or e-mail accounts.

Figure 6:
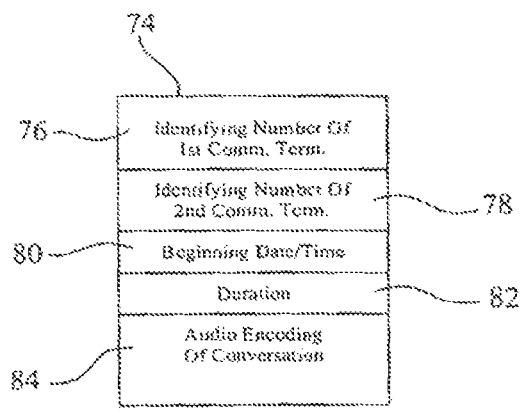
FIG. 6 is a diagram showing the components of a representative recorded conversation file according to the invention.

As shown in FIG. 6, the recorded conversation file 74 may contain an identifying number 76 of the first communication terminal, an identifying number 78 of the second communication terminal, a date/time stamp 80 indicating the date and time that the recording began, an indication 82 of the duration of the recorded conversation, and an audio encoding 84 of the recorded conversation.

Figure 7:
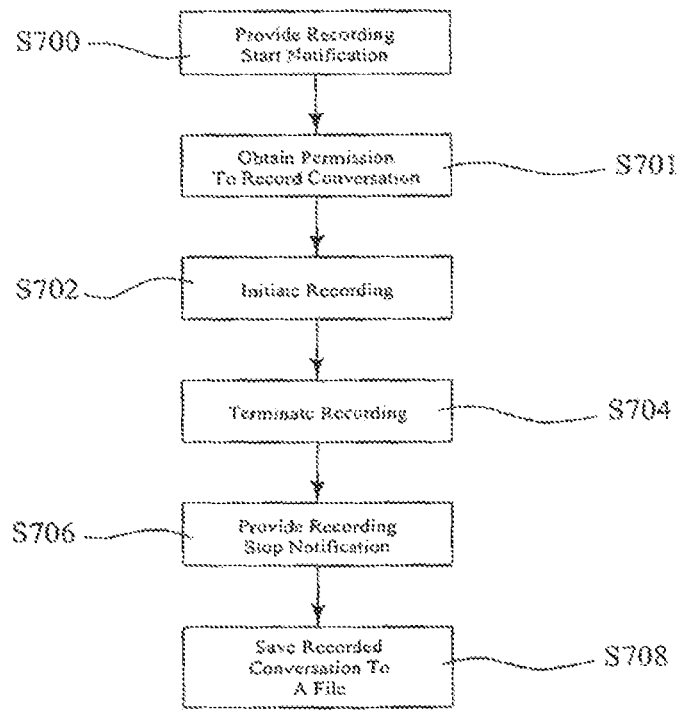
FIG. 7 is a logic flow diagram of a method for operation of a recording device for recording a conversation according to the embodiment of FIG. 1.

FIG. 7 shows an exemplary method for operation of a recording device for recording a conversation between a user of a first communication terminal and a user of a second communication terminal, including the steps of: S700 providing a recording start notification to the second communication terminal in response to receiving a request to initiate recording from a first communication terminal; S701 obtaining permission to record the conversation from the second communication terminal; S702 initiating recording of the conversation; S704 terminating recording of the conversation in response to receiving a terminate recording request from the first communication terminal; S706 providing a recording stop notification to the second communication terminal; and S708 saving the recorded conversation to a file.

Remote Notification and Recording Platform

Figure 8:
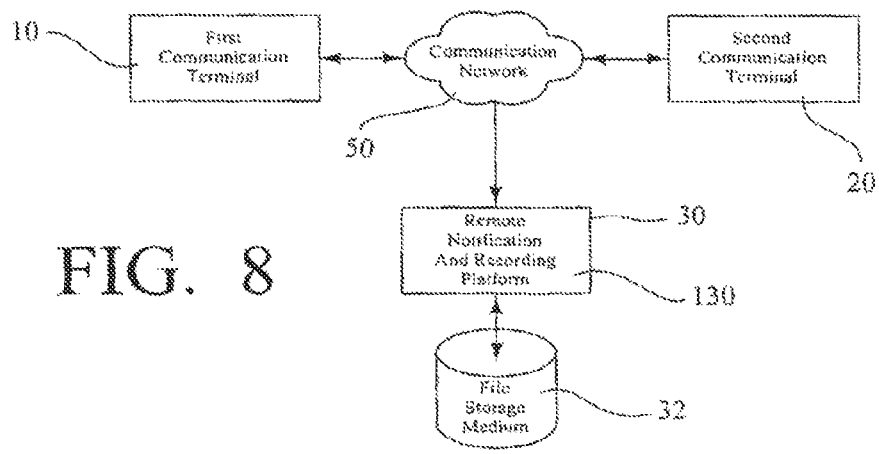
FIG. 8 is a block diagram showing a system for recording a conversation according to another embodiment of the invention, where the recording device is a remote notification and recording platform.

FIG. 8 shows in more detail the embodiment where the recording device 30 is a remote notification and recording platform 130. Thus, the system of the remote notification and recording platform embodiment has a communication network 50, and a first communication terminal 10, a second communication terminal 20 and a recording device 30 (referred to as a remote notification and recording platform 130 for this embodiment) all being in communication with each other through the communication network 50. The system also has a file storage medium 32. The file storage medium 32 is in communication with the remote notification and recording platform 130.

Figure 9:
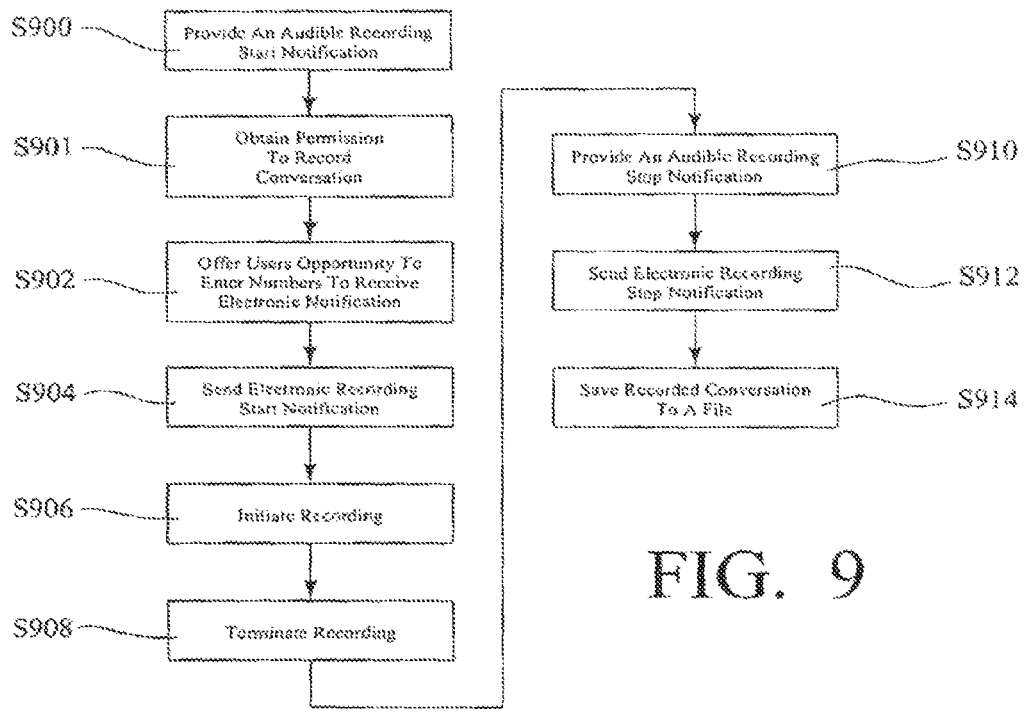
FIG. 9 is a logic flow diagram of a method of operation of the remote notification and recording platform of FIG. 8.

FIG. 9 shows the steps of an exemplary method for operation of a system having a remote notification and recording platform. Referring to both FIGS. 8 and 9, during a conversation between a user of the first communication terminal 10 and a user of a second communication terminal 20, the user of the first communication terminal 10 may initiate recording of the conversation by using the touchpad of the first communication terminal 10 to bridge on the remote notification and recording platform 130 using standard multi-party conferencing methods. Advantageously, one of skill in the art will recognize that multi-party conferencing methods will allow the exemplary system and method to be utilized with conversations involving three or more parties, in addition to the two-party scenario described herein. Thus, the two-party scenario used in this description is not intended to unnecessarily limit the scope of the hereafter claimed invention.

Once the remote notification and recording platform 130 is bridged into the conversation, the method for operation of the remote notification and recording platform 130 includes the steps of S900 providing an audible recording start notification to all bridged parties, and S901 obtaining permission to record the conversation from the second communication terminal. The method then includes the steps of: S902 offering all parties an opportunity, via DTMF dialing, to enter their numbers to receive an electronic notification that the recording of the conversation has initiated; and S904 sending an electronic recording start notification to those parties that entered numbers. The electronic notification will include a date/time stamp indicating the date and time that the recording was initiated, as discussed above. The next step is S906 initiating recording of the conversation.

When the user of the first communication terminal 10 decides to stop recording the conversation, they will use the touchpad of the first communication terminal 10, using special digits, to send a terminate recording request. In response, the method proceeds with the steps of: S908 terminating recording of the conversation; and S910 providing an audible recording stop notification to all bridged parties. Additionally, if any of the parties entered their numbers, the method will S912 send an electronic recording stop notification to those parties. The next step is S914 saving the recorded conversation to a file in the file storage medium.

Once the recording is complete and the file is saved, the user of the first communication terminal 10 can e-mail or download the file to remote computer or e-mail accounts. At a minimum, the file will contain identifying numbers of all known parties, a beginning date/time stamp, and the duration of the recorded conversation in minutes and seconds.

Recording Device in Communication Terminal

Figure 10:
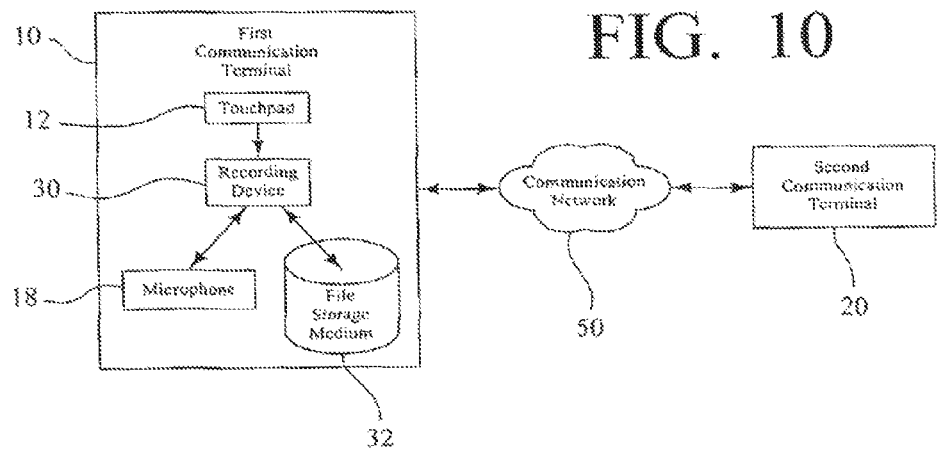
FIG. 10 is a block diagram showing a system for recording a conversation according to yet another embodiment of the invention, where the recording device is in the first communication terminal.

FIG. 10 shows in more detail the embodiment where the recording device 30 is located in one of the communication terminals. Thus, the system of the embodiment where the recording device 30 is in one of the communication terminals has a communication network 50, and a first communication terminal 10 and a second communication terminal 20. The first communication terminal 10 has a touchpad 12, a microphone 18, a recording device 30, and a file storage medium 32.

Figure 11:
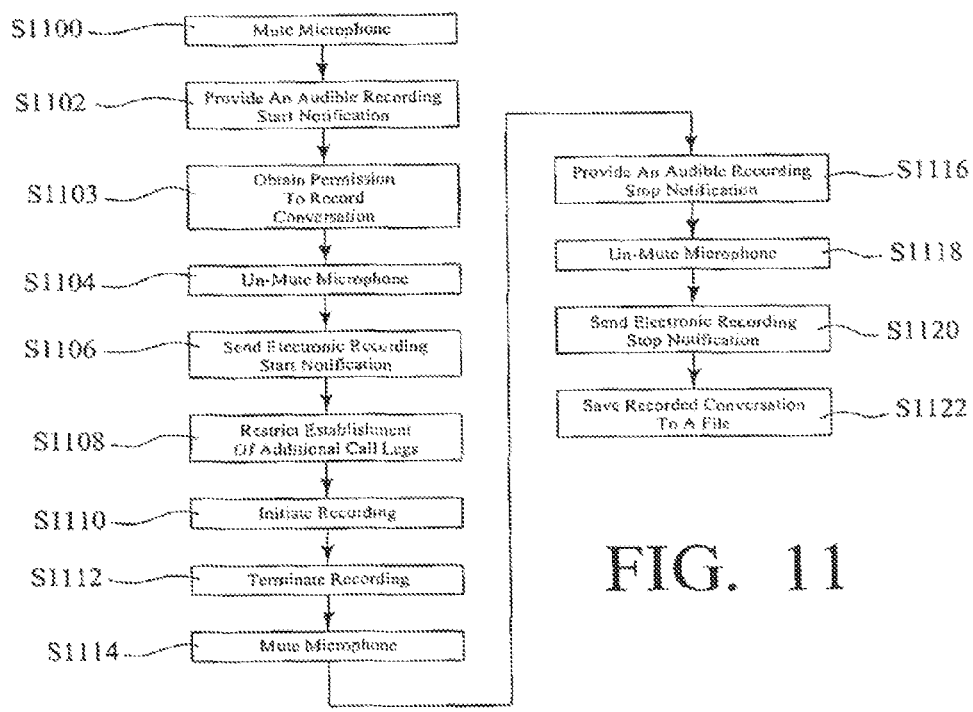
FIG. 11 is a logic flow diagram of a method of operation of the recording device of FIG. 10.

FIG. 11 shows the steps of an exemplary method for operation of a system having a recording device located in one of the communication terminals. With reference to FIGS. 10 and 11, during a conversation between a user of the first communication terminal 10 and a user of a second communication terminal 20, the user of the first communication terminal 10 may initiate recording of the conversation by using the touchpad 12 of the first communication terminal 10 to send an initiate recording request to the recording device 30. Then, the method for operation of the recording device 30 includes the steps of: S1100 muting the microphone 18 in response to receiving the initiate recording request; S1102 providing an audible recording start notification to the second communication terminal; S1103 obtaining permission to record the conversation from the second communication terminal; S1104 unmuting the microphone 18; and S1110 initiating recording of the conversation. The method also includes the step of S1106 sending an electronic recording start notification to the user of the second communication terminal 20. The electronic notification will include a date/time stamp indicating the date and time that the recording was initiated. Still further, the method includes the step of S1108 restricting the establishment of additional call legs when the recording is active.

When the user of the first communication terminal 10 decides to stop recording the conversation, they will use the touchpad 12 of the first communication terminal 10 to send a terminate recording request. In response, the method proceeds with the steps of: S1112 terminating recording of the conversation; S1114 muting the microphone 18; S1116 providing an audible recording stop notification to the second communication terminal 20; and S1118 unmuting the microphone 18. Additionally, the method also includes the step of S1120 sending an electronic recording stop notification to the second communication terminal. The next step is S1122 saving the recorded conversation to a file in the file storage medium.

Once the recording device 30 completes the recording and saves the file, the user of the first communication terminal 10 can e-mail or download the file to remote computer or e-mail accounts. At a minimum, the file will contain identifying numbers of all known parties, a beginning date/time stamp, and the duration of the recorded conversation in minutes and seconds.

The representative system embodiments described herein, including the described elements thereof, could be implemented on digital computing equipment, or the equivalent, through the use of computer programs, or the equivalent. Additionally, the various method aspects of the invention may also be found as executable instructions contained on a computer readable medium.

Thus, the invention provides conversation recording with real-time notification. One of ordinary skill in the art will recognize that additional configurations are possible without departing from the teachings of the invention or the scope of the claims which follow. This detailed description, and particularly the specific details of the exemplary embodiments disclosed, is given primarily for clearness of understanding and no unnecessary limitations are to be understood therefrom, for modifications will become obvious to those skilled in the art upon reading this disclosure and may be made without departing from the spirit or scope of the claimed invention.

What is claimed is:

1. A first communication terminal comprising:
a recording device; and
a computer readable medium storing instructions that, when executed, cause the recording device to perform operations comprising
receiving an initiate recording request to initiate a recording of a conversation between a first user of the first communication terminal and a second user of a second communication terminal,
providing, to the second communication terminal in response to receiving the initiate recording request, a first recording start notification indicating, to the second communication terminal, that the recording has been initiated, the first recording start notification comprising first timing information associated with initiation of the recording,
providing, to the second communication terminal, a second recording start notification comprising an audible message indicating, to the second communication terminal, that the recording has been initiated,
before providing the second recording start notification to the second communication terminal, muting a microphone of the first communication terminal to eliminate, for the second user of the second communication terminal, interference received from the microphone of the first communication terminal,
after providing the second recording start notification to the second communication terminal, unmuting the microphone of the first communication terminal to allow the conversation to resume,
recording the conversation,
in response to receiving a terminate recording request, terminating recording of the conversation,
muting the microphone of the first communication terminal, and
providing a recording stop notification to the second communication terminal, and
after providing the recording stop notification to the second communication terminal, unmuting the microphone of the first communication terminal.

2. The first communication terminal of claim 1, further comprising a touchpad comprising a key, wherein the initiate recording request is received, by the recording device, via selection of the key of the touchpad.

3. The first communication terminal of claim 1, wherein the first recording start notification further comprises an identifier of the first communication terminal.

4. The first communication terminal of claim 1, wherein the operations further comprise providing, to the second communication terminal, a permission request prompting the second user of the second communication terminal to authorize the recording of the conversation.

5. The first communication terminal of claim 4, wherein the permission request is an electronic message.

6. The first communication terminal of claim 4, wherein the operations further comprise receiving, in response to the permission request, a permission acknowledgement from the second communication terminal, the permission acknowledgement authorizing the recording of the conversation.

7. The first communication terminal of claim 6, wherein the permission acknowledgement from the second communication terminal comprises one of an electronic message or an audible response.

8. The first communication terminal of claim 1, wherein the operations further comprise sending, to the first communication terminal and the second communication terminal, a call leg restriction command for preventing the first communication terminal and the second communication terminal from establishing other call legs while the conversation is recorded.

9. The first communication terminal of claim 1, wherein the operations further comprise saving the recording of the conversation to a file.

10. The first communication terminal of claim 9, wherein the file contains a first identifier of the first communication terminal, a second identifier of the second communication terminal, a duration of the recording of the conversation, and the recording of the conversation.

11. The first communication terminal of claim 1, wherein the recording stop notification comprises second timing information associated with terminating recording of the conversation.

12. A method comprising:
receiving, at a recording device of a first communication terminal, an initiate recording request to initiate a recording of a conversation between a first user of the first communication terminal and a second user of a second communication terminal;

providing, by the recording device to the second communication terminal in response to receiving the initiate recording request, a first recording start notification indicating, to the second communication terminal, that the recording has been initiated, the first recording start notification comprising first timing information associated with initiation of the recording;

providing, to the second communication terminal, a second recording start notification comprising an audible message indicating, to the second communication terminal, that the recording has been initiated;

before providing the second recording start notification to the second communication terminal, muting a microphone of the first communication terminal to eliminate, for the second user of the second communication terminal, interference received from the microphone of the first communication terminal;

after providing the second recording start notification to the second communication terminal, unmuting the microphone of the first communication terminal to allow the conversation to resume;

recording, by the recording device, the conversation;

in response to receiving a terminate recording request,
terminating recording of the conversation,
muting the microphone of the first communication terminal, and
providing a recording stop notification to the second communication terminal, and
after providing the recording stop notification to the second communication terminal, unmuting the microphone of the first communication terminal.

13. The method of claim 12, wherein the first recording start notification further comprises an identifier of the first communication terminal.

14. The method of claim 12, further comprising sending, to the first communication terminal and the second communication terminal, a call leg restriction command for preventing the first communication terminal and the second communication terminal from establishing other call legs while the conversation is recorded.

15. The method of claim 12, further comprising providing, to the second communication terminal, a permission request prompting the second user of the second communication terminal to authorize the recording of the conversation.

16. The method of claim 15, further comprising receiving, in response to the permission request, a permission acknowledgement from the second communication terminal, the permission acknowledgement authorizing the recording of the conversation.

17. The method of claim 16, wherein the permission acknowledgement from the second communication terminal comprises one of an electronic message or an audible response.

18. The method of claim 12, wherein the recording stop notification comprises second timing information associated with terminating recording of the conversation.

19. The method of claim 12, further comprising saving the recording of the conversation to a file.

20. The method of claim 19, wherein the file contains a first identifier of the first communication terminal, a second identifier of the second communication terminal, a duration of the recording of the conversation, and the recording of the conversation.

* * * * *